United States Patent [19]

Helm et al.

[11] 3,802,780

[45] Apr. 9, 1974

[54] OPTICAL DEVICE FOR POSITION LOCATION

[75] Inventors: David P. Helm, Burke; Carlyle D. Charlton, Alexandria, both of Va.

[73] Assignee: The United States of America as represented by the Secretary of the Army, Washington, D.C.

[22] Filed: June 12, 1972

[21] Appl. No.: 262,164

[52] U.S. Cl. ................... 356/152, 356/5, 356/141, 340/26
[51] Int. Cl. ........................................... G01b 11/26
[58] Field of Search ........... 356/4, 5, 141, 152, 210; 340/26

[56] References Cited
UNITED STATES PATENTS
| | | | |
|---|---|---|---|
| 3,720,468 | 3/1973 | Skagerlund | 356/4 |
| 3,709,607 | 1/1973 | McConnell et al. | 356/152 |
| 1,898,474 | 2/1933 | Willoughby | 340/26 |

FOREIGN PATENTS OR APPLICATIONS
| | | | |
|---|---|---|---|
| 87,374 | 6/1959 | Denmark | 356/141 |

OTHER PUBLICATIONS

G. Ammon et al., Applied Optics, Vol. 9, No. 10, 10-1970.

Primary Examiner—Maynard R. Wilbur
Assistant Examiner—S. C. Buczinski
Attorney, Agent, or Firm—Edward J. Kelly; Herbert Berl; Milton Lee

[57] ABSTRACT

An optical positioning device providing range and relative positional alignment between two bodies utilizing an autocollimation technique. One body carries the illumination source and detector while the second body carries a retroreflector. Range information is determined by timing a pulse-modulated beam. Angular displacement is determined as a function of the difference between the measured off-axis beam intensity variation and the calculated intensity for the given range.

9 Claims, 2 Drawing Figures

PATENTED APR 9 1974　　　　　　　　　　　　　　　　3,802,780

OPTICAL DEVICE FOR POSITION LOCATION

The invention described herein may be manufactured, used, and licensed by or for the Government for governmental purposes without the payment to us of any royalty thereon.

BACKGROUND

This invention is designed to serve as a precision optical alignment system that will permit a moving body to be accurately aligned along a path and moved therealong to a particular location with respect to another body or location. For example, it will provide a system for guiding a helicopter to a lower point and then aid it in maintaining that position in space. Or, the system can be used to guide an aircraft from an approach fix, along an optical glide slope to a landing.

One present form of an optical approach system known as a Visual Approach Slope Indicator (VASI), utilizes two, four or 12 bar light source units arranged at the approach end of the runway perpendicularly to the centerline. The units are arranged along the runway to provide upwind and downwind bars of light to approaching aircraft. The desired glide slope is between the upwind and downwind light beams provided by these sets of light bars. Each bar projects a red or white bar of light depending upon the inclined viewing angle. White light seen by the pilot as he descends indicates that the aircraft approach is "high" in relation to the light bar; while red light bars indicate the approach is "low." The descending craft is properly aligned on the glide slope when the upwind light bars are red, while the downwind bars are white. This system, because of the necessary spacing between the light units, would not be feasible in remote field use for accurately guiding VTOL craft, i.e., helicopters, into very limited landing areas where precise positioning is critical. Nor would such a system be readily adaptable to automatic control of the aircraft in making an approach or hovering at a particular point.

SUMMARY OF THE INVENTION

The instant invention permits precise alignment of a craft along a path through the use of an autocollimation technique. The craft carrying the illumination source, for example, a spontaneous emitter, such as a semiconductor diode, transmits a pulse-coded beam of light to the desired touchdown location. The retroreflector positioned at the touchdown area reflects the light beam back to the detector-receiver in the craft. Range information is obtained from the pulse-coded beam. The effect of atmospheric absorption and scattering is accounted for. The amplitude of the reflected beam as a function of range is determined from an application of the inverse square law applied to optical radiation and the result stored for comparison. The amplitude of the detected signal is also a function of the relative angle between the axes of the retroreflector and transceiver optics. This intensity varies according to a $\cos^4\theta$ relationship where $\theta$ is the relative angle between the transmitted beam and the retroreflector optic axis. Since the signal amplitude is known for a given range, if, for example, the comparison of a subsequent reflected signal shows a change in amplitude while no change in range has occurred, it follows that the craft has only moved angularly with respect to the glide slope axis. Or, if both the range and relative angle change, the amount of range change and angular position change are determined by comparison of subsequent signals, actual and theoretical, derived from the detector, To summarize, the invention functions as follows:

first a pulse-coded beam is transmitted to, and reflected back from, a retroreflector;

The transmit time of the coded pulse determines the range between the transmitter-detector and the retroreflector;

from this known range a theorectical amplitude of the light signal returned to the detector is determined;

this theoretical amplitude is compared to the actual measured signal amplitude; and, any amplitude difference for a given range must be due to misalignment of the axis of the transmitted beam with respect to the retroreflector, and the degree of misalignment is determined from the variation of amplitude of a retroreflected signal as a function of $\cos^4\theta$.

Continuous repetition of the above procedure gives continuous range change and alignment variation.

DESCRIPTION OF THE PREFERRED EMBODIMENT

Figure 1:
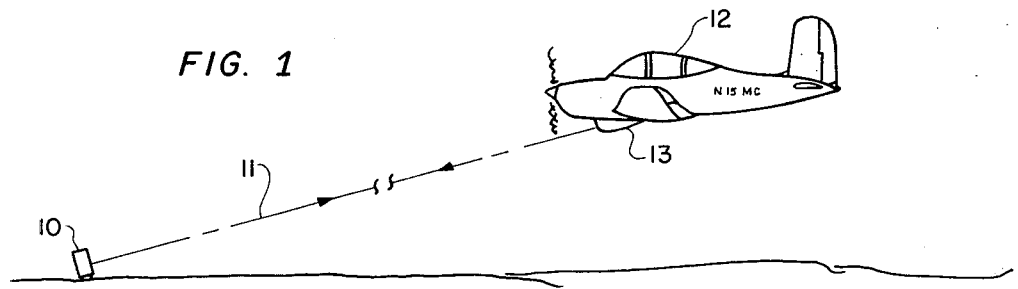
FIG. 1 represents a typical installation showing an aircraft approaching along an optical glideslope.

Referring now to FIG. 1, a retroreflector 10 is located at a particular landing site. The glideslope 11 is angularly oriented to meet the optimal approach angle of a particular type of craft, i.e., conventional fixed wing or V/STOL. Aircraft 12 having an optical transceiver 13 positioned therein is shown descending along the glideslope.

Figure 2:
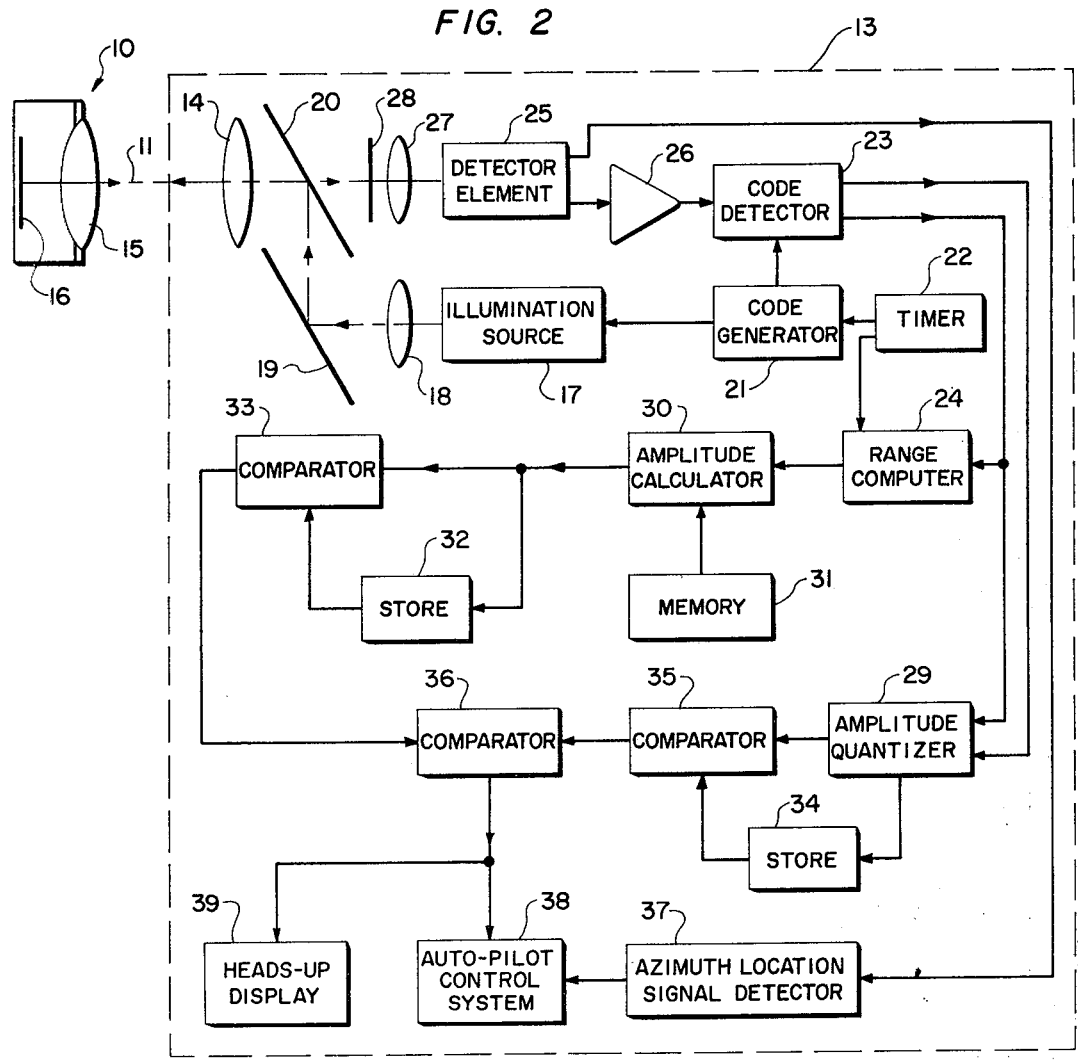
FIG. 2 is a system diagram of the invention.

Turning to FIG. 2, the retroreflector 10 comprises a simple lens element 15 and a plane reflector 16 located in the focal plane of lens 15. The amplitude of a beam of light reflected from a retroreflector such as 10 is known to vary as a function of $\cos^4\theta$; where $\theta$ is the angle of the incident and reflected beam with respect to the optical axis of the retroreflector.

The transceiver for transmitting and then receiving an optical beam is located in the craft 12 and consists of a source of illumination 17 at the focal plane of a projection optics system 14, 18 as in the manner of a searchlight. In order to avoid complicated boresighting and alignment of an optical system, a reflector 19 and beamsplitter 20 are utilized to provide a common path for the output beam and the returning reflected beam.

Since it is necessary to know the distance between the transceiver 13 and the retroreflector 10, a code generator 21 drives the illumination source 17 with a distinct set of pulses derived from a timer 22. The code generator 21 in simplest form could be composed of monostable multivibrators and buffer amplifiers arranged in a known fashion to provide to a single line output a set of pulses at some fixed intervals; which pulses constitute the code. Since the amplitude signal is required for comparison with a theoretical amplitude, only non-amplitude codes can be used for the range determination. The code generator feeds its output to the illumination source 17 and also to a code detector 23 to be described later. The timer 22, in a simple form, is a relaxation oscillator having a pulse or spike shaped output for use in triggering the code generator 21. The timer 22 operating at a high rate, provides an input to a range computer 24. The timer 22 would also include a countdown circuit to drive the code generator.

A detector 25 receives, through objective 27, the illumination reflected by the retroreflector 10. The detector 25 can be a quadrant detector or a multielement sensor; each sensor element having a single output to a video bandwidth amplifier 26 having a known gain.

To provide spectral signal enhancement against other light sources that might be seen by the detector 25, a narrow band filter 28 matched to the illumination source is provided in the optical path of the reflected beam to the detector 25.

The code detector 23, receiving the amplified signals from the detector 25, is of conventional design and operates in parallel to the output of the video amplifier in order that the coded pulses may be detected by the code detector without altering the amplitude of the returned signal. The code detector 23 senses not only the pulse, but its position in the frame of the code as well. The code detector 23 of any known type, could, for example, be composed of buffer amplifiers, binary multivibrators, a stroking circuit and a matrix of "and" type circuits. The code would be fed through the buffer amplifiers to a non-loading differentiator shaping circuit to trigger the binary multivibrators which act as registers. The pulse would be placed in the register at a location corresponding to its code position by the strobing circuit. The strobing circuit, essentially a pulse generator operating at the frequency of the code, would be initiated by the first, or any pulse of the code; since it is continuous. It would provide, by way of triggering monostable multivibrators, a pulse to each register to control its change of state in order; the register changing state only when there is a coincidence of an input pulse and a strobe pulse at its terminal.

The output of the code generator is fed to, and stored by, the code detector 23 in a similar set of registers. When the last register is strobed, the strobing circuit causes the registers to recycle. The registers are connected to a single output line through "and" type circuits. Each register in the input pulse line would be connected to its opposite in the code generator line by the "and" circuit. The presence of the same state in respective registers produces coincidence output. This output is the code detection and is fed to a range computer 24 and to an amplitude quantizer 29.

The range computer 24, of a conventional type associated with laser rangefinders, determines the range to the retroreflector and feeds the range in digital form to an amplitude calculator 30. The amplitude calculator 30 takes the form of a special pre-wired program digital computer wherein the calculation of a theoretical light signal amplitude is based upon a range equation considering the known detector characteristics and a known range. The advantage of such a special purpose processor is that the signal transfer characteristic can be inserted, in digital format, and used as a look-up table to determine what the signal amplitude should be for a given range. Further, the system can be calibrated and the results used to update the table of transfer characteristics. A memory 31 stores the known system parameters, i.e., illuminator power, efficiencies, detector and amplifier characteristics. The memory 31 is organized as a read-only special purpose computer. The contents are variable so that calibration, aging, etc. can be entered at maintenance intervals.

The theoretical amplitude calculation made in calculator 30 is both entered in a store 32 and sent to a comparator 33. The store 32 is made up of a set of digital registers. In operation, it stores on one cycle and then reads out the stored data to the comparator 33 on the next cycle. The comparison circuit of comparator 33 compares the theoretical amplitude calculation of one cycle to the amplitude calculation of the next subsequent cycle. This comparison is a subtraction of the second cycle amplitude from the amplitude of the first cycle. It is performed by digital shift registers operating in parallel. The output is a digital representation of the magnitude of the difference of the two signals.

The amplitude quantizer 29 is an analog to digital converter operating on the amplitude of the signal received from the code detector 23. The quantizing operation functions on a scheme using the magnitude of a pulse of the code; but it could also average the magnitudes of the pulses of the code or use some other weighting scheme to insure accuracy of the amplitude measurement. The output of the quantizer 29 is a parallel digital representation of the analog amplitude measured signal from the code detector 23.

Both the store 34 and the comparator 35 operate in a manner identical with the function of the store 32 and the comparator 33.

The final comparison is that of two parallel digital signals, i.e., the comparison of the calculated amplitude obtained from comparator 33 with the measured quantized amplitude derived from comparator 35. It is made in comparator 36.

The output provided by comparator 36 is a zero, positive or negative signal. A zero output is indicative of being on the same bearing. A positive or negative signal indicates movement toward or away from the selected bearing. This output signal when coupled with an azimuth angle signal derived from an azimuth location signal detector 37 and determined by the position of the returning beam on the quadrant or particular elemental detector surface, i.e., high, low, left or right in relation to the bearing, provides a correcting signal to a conventional autopilot control system 38 on the craft 12 to keep it on the desired path. Alternatively, or in combination therewith, the combined signals may be presented visually to the pilot by an electronically generated display; as for instance a television system combined with a known type of heads-up display 39 in the pilot's field of vision.

Since many variations, alterations, and substitutions can be made to the above preferred embodiment of the invention, it is to be understood that the invention is to be limited only as defined by the appended claims.

We claim:

1. A method of determining the position of a movable body, having an optical beam transmitter and detector associated therewith, relative to a particular location at which a retroreflector is positioned, whereby the distance therebetween, and the relative alignment thereof is determined, comprising the steps of:
   a. transmitting a coded optical energy beam from said optical transmitter so said retroreflector, b. determining the distance between the retroreflector and the detector by measuring the transit time of the coded beam, c. calculating the theoretical amplitude of the detected beam transiting said determined distance, d. measuring the actual amplitude of the optical beam returning from said retroreflector, e. calculating the difference between the measured amplitude and the theoretical amplitude of the detected beam, f. computing the misalignment between the optical axis of the retroreflector and the optical axis of the transmitted beam as a trigonometric function of the difference between the measured amplitude and the theoretical amplitude.

2. The method according to claim 1 wherein steps (a) through (f) are continuously repeated, whereby changes in distance and alignment are continuously obtained.

3. The method according to claim 2, including the step of determining the azimuth angle of the returning beam signal, whereby the direction of misalignment is determined.

4. The method according to claim 3 including the step of controlling the movable body in response to the degree and direction of misalignment.

5. The method according to claim 3 including the step of visually displaying the degree and direction of misalignment to an operator of the movable body.

6. A system for determining the distance and angular alignment of a body relatively movable with respect to a particular location, comprising:

means associated with said body for transmitting a pulse-coded optical energy beam to said location;

retroreflective means positioned at said location for returning said beam to said body;

optical detector means associated with said body for receiving said returning beam;

means for computing range from the returning pulse-coded beam;

means for calculating a theoretical amplitude of the returned beam as a function of the computed range;

means for quantizing the actual amplitude of the returning energy beam;

comparison means for comparing the measured quantized amplitude signal with the theoretical amplitude signal and for producing an output signal; whereby the variation of the angular alignment of the body with respect to the optical axis of the retroreflector is determined from the difference of the compared signals.

7. The system according to claim 6, including means associated with said detector for determining the azimuth angle of the returning beam, whereby the relative direction of misalignment is determined.

8. The system according to claim 7 including means responsive to said output signal for returning the movable body to the desired alignment path.

9. The system according to claim 7 including means to provide a visual display of said output signal to an operator of the movable body.

* * * * *